United States Patent
Zhang et al.

(10) Patent No.: US 10,506,082 B2
(45) Date of Patent: Dec. 10, 2019

(54) HIGH AVAILABILITY (HA) INTERNET PROTOCOL SECURITY (IPSEC) VIRTUAL PRIVATE NETWORK (VPN) CLIENT

(71) Applicant: Fortinet, Inc., Sunnyvale, CA (US)

(72) Inventors: GangGang Zhang, Coquitlam (CA); Weining Wu, Surrey (CA); Jinhai Yang, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 292 days.

(21) Appl. No.: 15/454,682

(22) Filed: Mar. 9, 2017

(65) Prior Publication Data

US 2018/0262598 A1    Sep. 13, 2018

(51) Int. Cl.
*H04L 29/06* (2006.01)
*H04L 12/46* (2006.01)

(52) U.S. Cl.
CPC .......... *H04L 69/22* (2013.01); *H04L 12/4633* (2013.01); *H04L 12/4641* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 2004/0225895 A1* | 11/2004 | Mukherjee | .......... | H04L 12/4633 726/15 |
| 2005/0163079 A1* | 7/2005 | Taniuchi | ................. | H04W 8/02 370/331 |
| 2005/0265366 A1* | 12/2005 | Ejiri | .................... | H04L 63/0272 370/401 |
| 2013/0308597 A1* | 11/2013 | Murphy | .............. | H04L 12/4633 370/331 |
| 2015/0195265 A1* | 7/2015 | Chen | ....................... | H04L 63/08 726/3 |
| 2015/0271708 A1* | 9/2015 | Zaus | ..................... | H04W 76/18 370/230 |

* cited by examiner

*Primary Examiner* — Rebecca E Song
(74) *Attorney, Agent, or Firm* — Jaffery Watson Mendonsa & Hamilton, LLP

(57) ABSTRACT

Systems and methods for providing an HA IPsec VPN client. According to one embodiment, an IPsec tunnel is established by a client with a VPN gateway through a first interface. An IP address of the first interface is bound as the local endpoint of the tunnel and the IP address of the VPN gateway is bound as the remote endpoint of the tunnel. Responsive to detection by the client that a second interface of the client machine has been selected to serve as the local endpoint, an IP address of the second interface is bound as the local endpoint. An IP packet is transmitted by the client machine to the VPN gateway by generating an ESP packet including an encrypted form of the IP packet and encapsulating the ESP packet with an outer IP header including the IP address of the second interface.

20 Claims, 7 Drawing Sheets

HIGH AVAILABILITY (HA) INTERNET PROTOCOL SECURITY (IPSEC) VIRTUAL PRIVATE NETWORK (VPN) CLIENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017, Fortinet, Inc.

BACKGROUND

Field

Embodiments of the present invention generally relate to the field of computer networking and network security. In particular, various embodiments relate to systems and methods for providing a high availability IPsec VPN client based on the existence of multiple redundant network connections and using a floating tunnel termination endpoint technique on the local termination endpoint.

Description of the Related Art

Enterprise customers are now demanding cost-effective, outsourced connectivity and security services, such as Virtual Private Networks (VPNs). A VPN is a private network that takes advantage of public telecommunications (e.g., the Internet) and maintains privacy through use of tunneling protocols and security procedures. Usually, a VPN gateway is setup within a private network (e.g., an enterprise network) and VPN client software is installed on client machines of users of the private network. A user may then dial up the VPN gateway from the VPN client and establish an IPsec tunnel with the private network. Data packets originated by the client machine are encrypted by the VPN client and transmitted to the VPN gateway through the IPsec tunnel to prevent eavesdropping by 3rd parties that may attempt to intercept communications exchanged between the client machine and the private network.

A typical client machine comprises multiple network interfaces, e.g., wired local area network (LAN) and wireless LAN (WLAN) interfaces. Some client machines may also include one or more wireless wide area network (WWAN) interfaces in the form of 3G/4G/LTE cards provided by a wireless communication provider. These WWAN interfaces provide network redundancy and may provide uninterrupted network connectivity when one of the other network connections is broken. For example, when a wired LAN network connection of a personal computer (PC) is broken because the network cable is unplugged from the LAN interface, the operating system of the PC may switch the network connection to a WLAN interface of the PC, and applications running on the client machine may keep accessing the network without interruption. However, in Encapsulating Security Payload (ESP) tunnel mode, existing IPsec VPN client implementations use fixed tunnel termination, which means the IPsec tunnel is bound to the network interface of the client machine at the time the IPsec tunnel is established and the IPsec tunnel cannot seamlessly migrate to another available network interface when the original network connection is broken. As such, in the context of current IPsec VPN client implementations, when the original network connection is broken the IPsec tunnel must be reestablished by the VPN client through an alternative available network interface resulting in the VPN connection being temporarily interrupted and an increase in overhead on the part of the VPN gateway.

Therefore, there is a need for a high availability IPsec VPN client that can seamlessly migrate between interfaces of a client machine.

SUMMARY

Systems and methods are described for a high availability IPsec VPN client. According to one embodiment, an IPsec tunnel is established by a client machine with a VPN gateway through a first network interface of the client machine. The IPsec tunnel includes a local endpoint and a remote endpoint. An IP address of the first network interface is initially bound as the local endpoint and the IP address of the VPN gateway is bound as the remote endpoint. It is detected by the client machine that a second network interface of the client machine has been selected to serve as the local endpoint for use in connection with exchanging communications between the client machine and the VPN gateway. Responsive to the detecting, the client machine binds an IP address of the second network interface as the local endpoint. An IP packet originated by an application running on the client machine is transmitted by the client machine to the VPN gateway by generating an encapsulating security payload (ESP) packet including an encrypted form of the IP packet and encapsulating the ESP packet with an outer IP header including the IP address of the second network interface.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
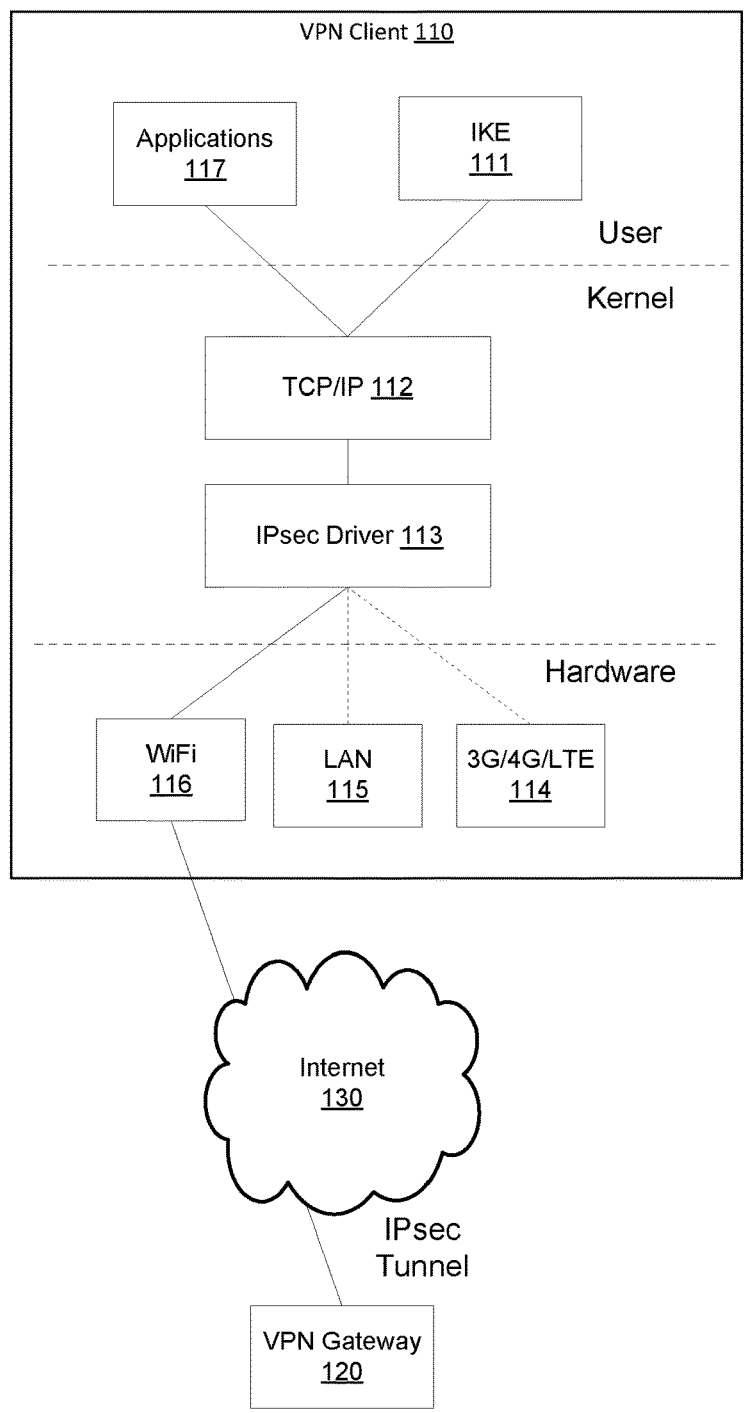
FIG. 1 illustrates an exemplary network architecture making use of a WiFi interface as a local tunnel termination endpoint in accordance with an embodiment of the present invention.

Systems and methods are described for a high availability IPsec VPN client. According to one embodiment, an IPsec VPN client establishes an IPsec tunnel with a VPN gateway through a first network interface of a client machine, wherein an IP address of the first network interface is bound as an endpoint of the IPsec tunnel. The IPsec VPN client detects a second network interface of the client machine is available within the client machine for communicating with the VPN gateway and binds an IP address of the second network interface as the endpoint of the IPsec tunnel. The IPsec VPN client encapsulates an outer IP header of an encapsulating security payload (ESP) packet with the IP address of the second network interface.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPsec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The term "cloud" generally refers to a public or private cloud infrastructure that delivers one or more services over a network (e.g., the Internet). Typically, the computer resources (hardware and software) of a cloud are hosted by a third party (the cloud provider). Examples of services that may be provided by a cloud include, but are not limited to, infrastructure, platform, software, network, storage, data, database, security, etc.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

Figure 2:
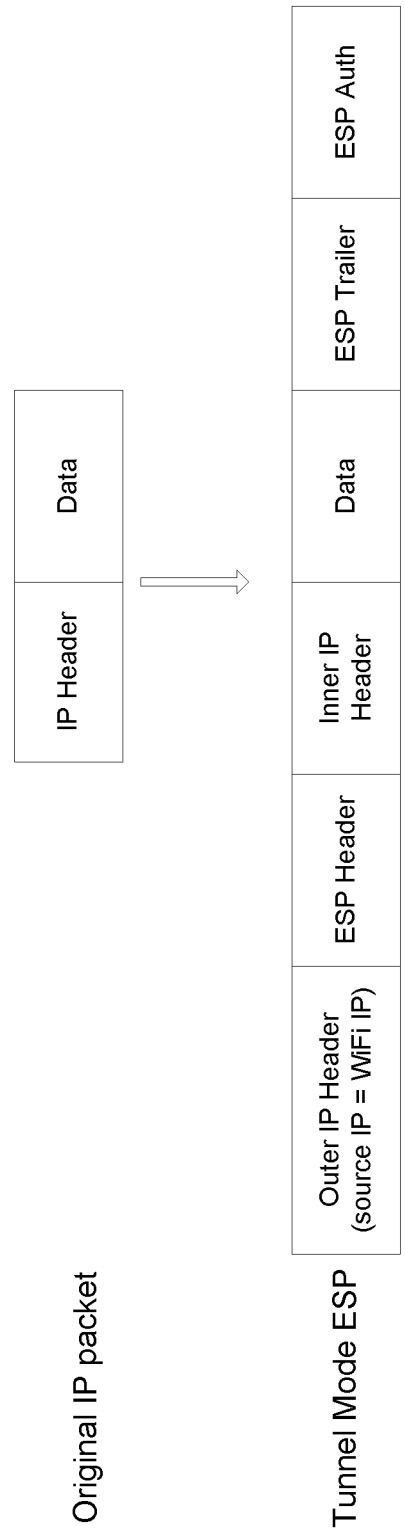
FIG. 2 illustrates structures of an original IP packet and a tunnel mode ESP data packet when using a WiFi interface of an IPsec VPN client in accordance with an embodiment of the present invention.

FIG. 1 illustrates an exemplary network architecture making use of a WiFi interface 116 as a local tunnel termination endpoint in accordance with an embodiment of the present invention. In the present example, network architecture 100 comprises a VPN client 110, a VPN gateway 120 and the Internet 130. VPN client 110 comprises a hardware layer and a software layer that is separated into a user space and a kernel space. In the context of the present example, VPN client 110 includes three network interfaces, i.e., a 3G/4G/LTE interface 114, a LAN interface 115 and WiFi interface 116. In the context of the current example, WiFi interface 116 is currently available and represents the local tunnel termination endpoint for an IPsec tunnel between VPN client 110 and VPN gateway 120. An Internet Key Exchange (IKE) daemon 111 and multiple applications may be running in the user space. IKE daemon 111 is used for negotiating with a peer IKE (not shown) of VPN gateway 120 to establish an IPsec tunnel for data transmissions between VPN client 110 and VPN gateway 120 and for detecting whether the peer IKE of VPN gateway 120 is alive after the IPsec tunnel is established. IKE daemon 111 may authenticate with VPN gateway 120, negotiate a matching IKE security association (SA) policy with VPN gateway 120 and set up an IKE tunnel during IKE phase 1. Then, IKE daemon 111 may negotiate IPsec SA parameters and set up a matching IPsec SA with VPN gateway 120 in IKE phase 2. The endpoint at VPN client 110 side of the IPsec tunnel is bound to the IP address of WiFi interface 116, which represents the currently active network connection. IPsec parameters and keys used for the IPsec tunnel, including endpoints of the tunnel, may be stored in IKE daemon 111 and/or IPsec driver 113. After the IPsec SA is established with VPN gateway 120, outbound data from applications 117 are transmitted to TCP/IP stack 112 and data packets formed by TCP/IP stack 112 are sent to IPsec driver 113 for encryption. If the data packets are to be secured in ESP tunnel mode based on corresponding IPsec policies stored in a security policy database (SPD), IPsec driver 113 encrypts the entirety of the original IP packets with the encryption specified in the SPD to construct an Encapsulating Security Payload (ESP), wherein the source IP address of an outer IP header is set to the IP address of WiFi interface 116 that is stored in the SA. FIG. 2 shows an example of an original IP packet and a tunnel mode ESP data packet in which the source IP address of the outer IP header is the IP address of the current local endpoint of the IPsec tunnel, e.g., WiFi interface 116 in the context of the present example. The ESP data packet is sent via the IPsec tunnel (shown in the solid line of FIG. 1 connecting WiFi interface 116 to VPN gateway 120 via Internet 130) through the currently available connection, WiFi interface 116. The IKE and data transfer processes associated with IPsec tunnel mode are well known to those skilled in the art. Therefore, further description thereof is omitted for brevity.

Figure 3:
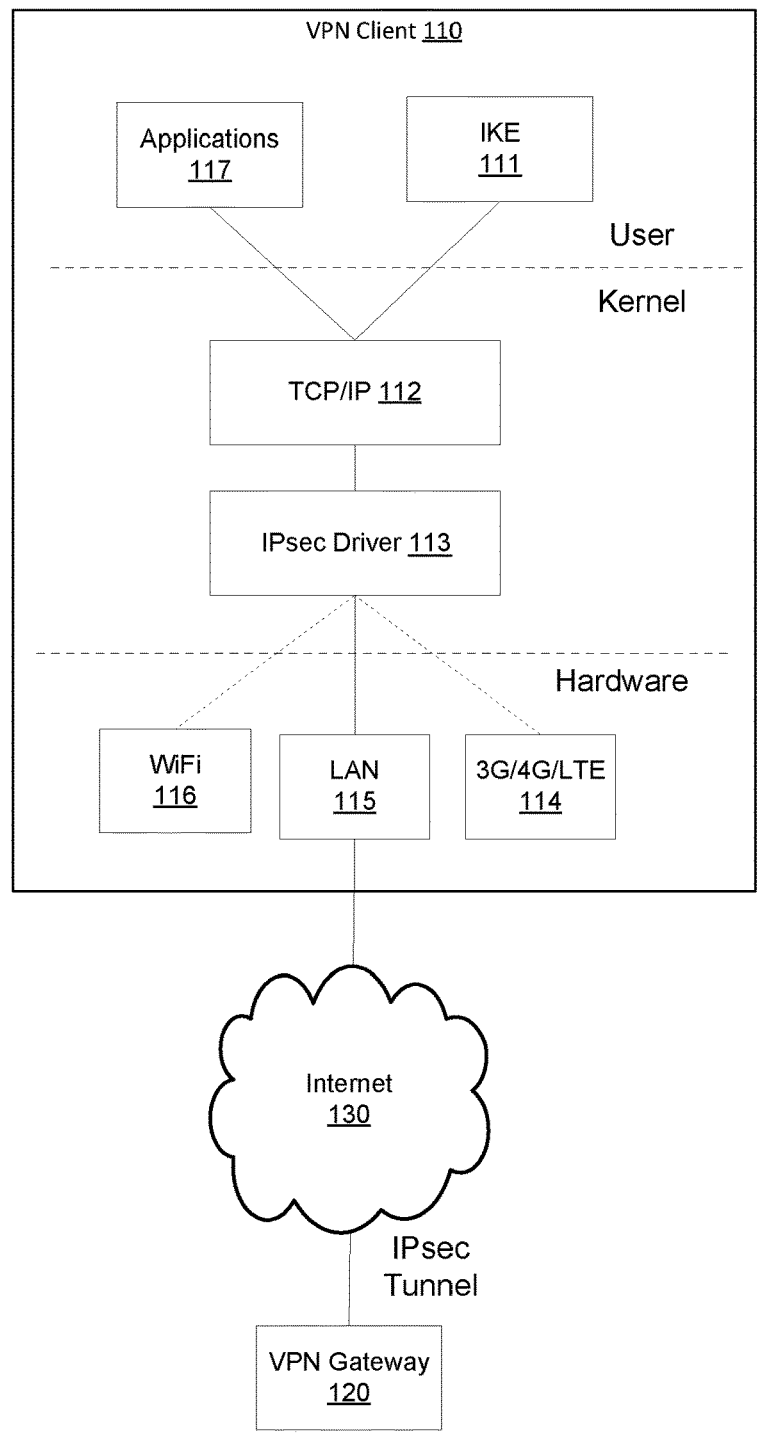
FIG. 3 illustrates an exemplary network architecture making use of a LAN interface as a local tunnel termination endpoint in accordance with an embodiment of the present invention.

FIG. 3 illustrates an exemplary network architecture making use of LAN interface 115 as a local tunnel termination endpoint in accordance with an embodiment of the present invention. In the present example, network connection of client machine 110 is switched from WiFi interface 116 to LAN 115 as shown by the solid line connecting VPN client 110 and VPN gateway 120 through Internet 130. Switching to a new network connection may occur when the old network connection is broken and another network connection is activated, for example, when a connection via WiFi interface 116 is broken, then 3G/4G/LTE interface 114 may be started to connect to the Internet 130. In another scenario, when a network connection with higher priority than the current network connection is established, multiple network connections are available. The operating system routes data packets to a network connection with the highest priority among the multiple available network connections for transferring data packets. For example, when a WiFi connection is available, the operating system switches to the WiFi connection for data transmission even though the 3G/4G/LTE connection may still be available.

Figure 4:
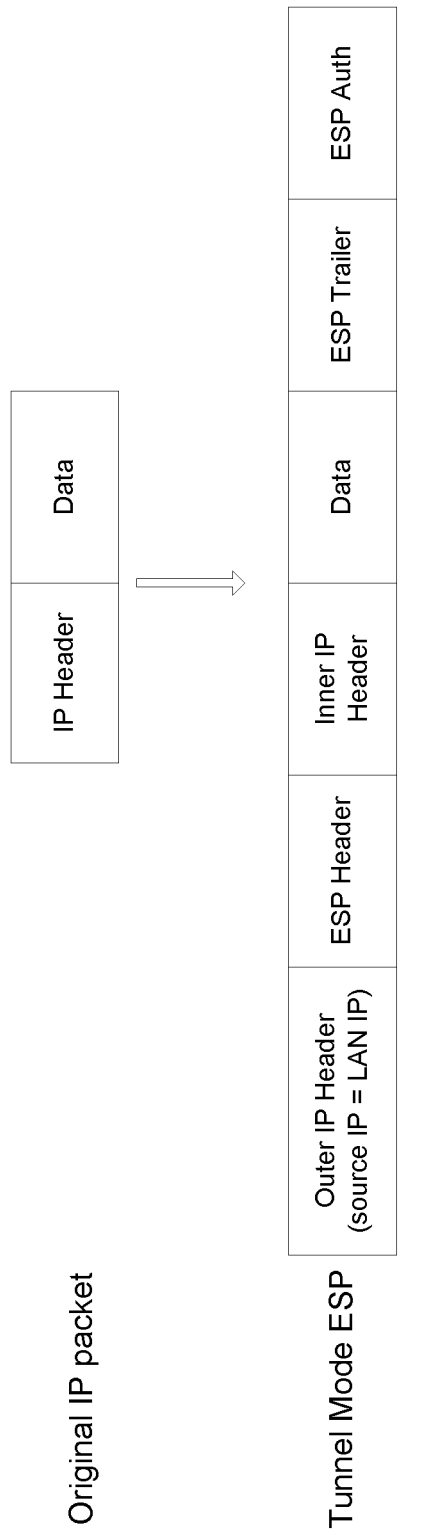
FIG. 4 illustrates structures of an original data packet and a tunnel mode ESP data packet when using a LAN interface of an IPsec VPN client in accordance with an embodiment of the present invention.

Because active or available network connections of a client machine on which VPN client 110 is running may be changed by the operating system of the client machine, IPsec driver 113 is configured to detect such changes and migrate the local IPsec tunnel endpoint from the old network connection to the currently active network connection to avoid re-establishing the IPsec tunnel on the active network connection. In order to detect the changing of active network connections, IPsec driver 113 may monitor for an IKE dead peer detection (DPD) message originated by IKE daemon 111 and destined for VPN gateway 120. The IP address of the active network connection may be extracted by IPsec driver 113 from the IP header of the IKE DPD message. If the IP address of the active network connection represents a change in the active network connection, IPsec driver 113 may determine that the local endpoint of the IPsec tunnel should be migrated from the prior network connection to the new network connection. The IP address of the active network connection may be stored in an SA database (SAD) by IPsec driver 113. When new original IP packets are received by IPsec driver 113, IPsec driver 113 forms corresponding ESP data packets by, among other things, retrieving the IP address of the active network connection from the SAD and using the retrieved IP address as the source IP address of the outer IP header of the ESP data packets. FIG. 4 shows an example of an original IP packet and a tunnel mode ESP in which the source IP address of outer IP header is the IP address of the currently active network interface, e.g., LAN interface 115 in the context of the present example. The ESP data packet is sent via the IPsec tunnel (shown in the solid line of FIG. 3 connecting LAN interface 115 to VPN gateway 120 via Internet 130) through the currently available connection, LAN interface 115.

Figure 5:
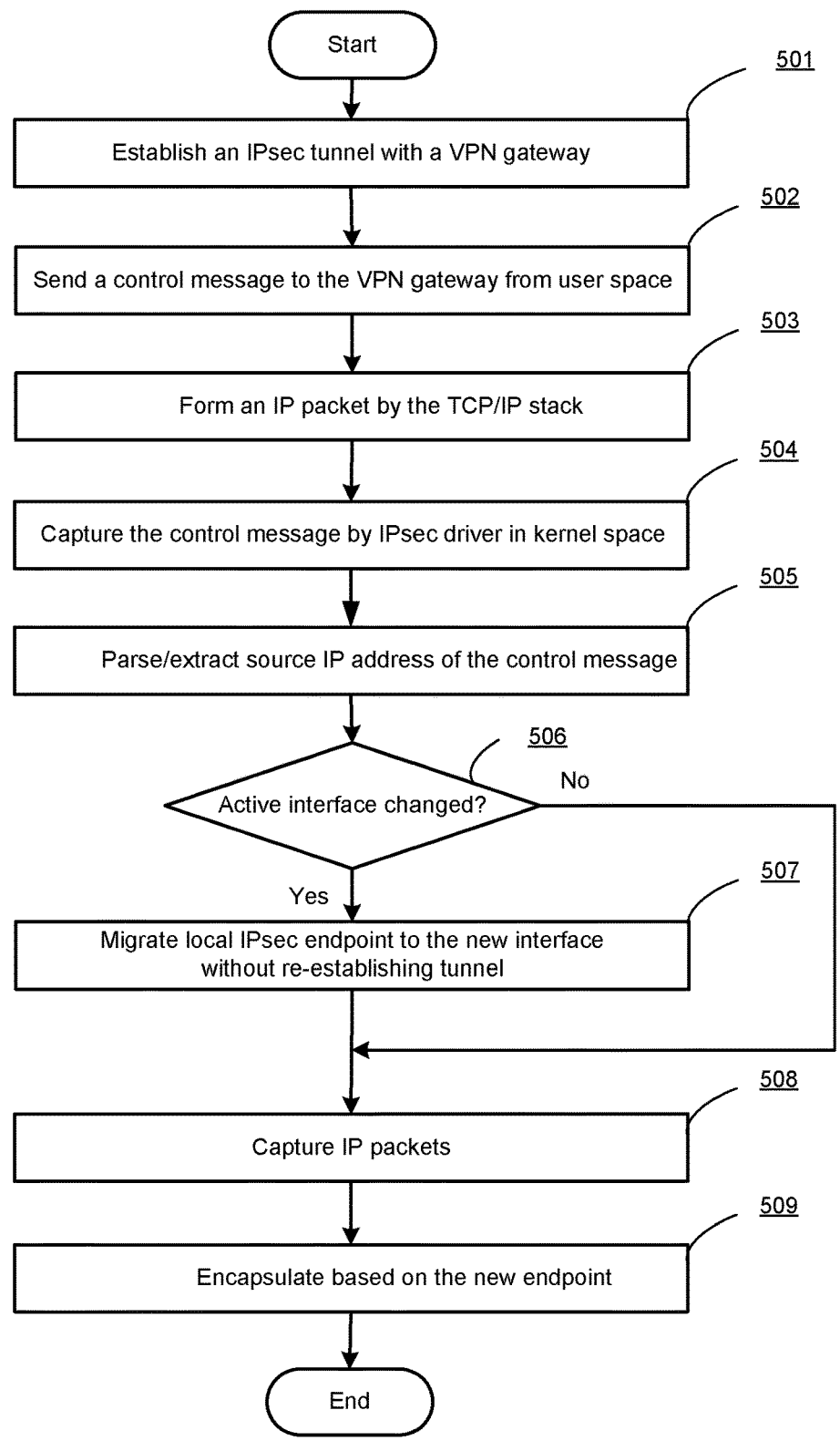
FIG. 5 is a flow diagram illustrating a method for seamlessly migrating an IPsec tunnel endpoint to a new network interface by an IPsec VPN client in accordance with an embodiment of the present invention.

FIG. 5 is a flow diagram illustrating a method for seamlessly migrating an IPsec tunnel endpoint to a new network interface by an IPsec VPN client in accordance with an embodiment of the present invention.

At block 501, an IKE daemon of a VPN client running on a client machine starts an IKE process and establishes an IPsec SA with a peer IKE of a VPN gateway. After the IPsec SA is established, the SA parameters, including endpoints of the IPsec tunnel, may be stored in the IKE daemon and/or the IPsec driver, wherein the endpoint of the IPsec tunnel at client machine side (the local endpoint) is represented by the IP address of the active network adapter at the time of the IKE negotiation. When an outbound IP packet is to be sent by a TCP/IP stack of the client machine, the outbound IP packet is processed by an IPsec driver before it is sent to a physical network interface for transmission. The IPsec driver retrieves an IPsec SA corresponding to the IP packet from the IKE daemon or the IPsec driver. If the IPsec SA of the IP packet is an ESP tunnel SA, the entire IP packet is encrypted and encapsulated within an ESP header and an outer IP header. The IP addresses of the outer IP header is set to the tunnel endpoints of the IPsec SA, wherein the source IP address of outer IP header is set to the IP address of the network interface that was active during the IKE negotiation.

At block 502, the IKE daemon may send a control plane message to the VPN gateway from a user space of a client machine. For example, an IKE dead peer detection (DPD) message may be sent to the peer IKE of the VPN gateway to detect if the peer IKE is alive. The IKE DPD message is a HELLO/ACK Notify message of Internet Security Association and Key Management Protocol (ISAKMP) that may be sent when the IKE daemon of the VPN client wants to check whether its peer IKE at the VPN gateway is still alive. It is also possible that the IKE DPD message is sent periodically rather than on demand to the peer IKE. Other types of control plane messages, such as keepalive or heartbeat messages may also or alternatively be used for detecting the liveness of the peer IKE. In other examples, the VPN client and VPN gateway may exchange proprietary control plane messages. Such control plane messages would be sent, for example, from the user space to a TCP/IP stack within the kernel space of the client machine for transmission to the VPN gateway.

At block 503, the TCP/IP stack encapsulates the control plane message with an IP header to construct an IP packet. The source IP address of the IP packet is set by the TCP/IP stack of the operating system to the IP address of the currently active network adapter (e.g., WiFi interface 116, LAN interface 115 or 3G/4G/LTE interface 114 of FIG. 1). If multiple network interfaces are active, the network interface with highest metric number or priority may be selected by the TCP/IP stack for transmitting the IP packet. The IP packet representing the control plane message is then sent to an IPsec driver before it is sent out to the VPN gateway.

At block 504, the IP packet is captured by the IPsec driver to determine whether it is to be secured based on the corresponding IPsec SA.

At block 505, the IPsec driver parses the IP packet to determine that it is a control plane message based on protocols used by the control plane message. For example, an IKE DPD message packet under ISAKMP is a User Datagram Protocol (UDP) packet with the source and destination UDP ports set to 500 (or 4500). When the IKE DPD message is captured by the IPsec driver, the source IP address of the IP packet is identified. As the IP packet is a control plane message, it does not need to be secured based on its IPsec SA and it is sent back to TCP/IP stack for transmission without any change.

At block 506, the IPsec driver determines whether the active network adapter has changed at the TCP/IP stack. In one example, the IPsec driver may compare the current IP address of the current local endpoint of the IPsec tunnel based on information stored in the SAD/SPD and compare the IP address of the current local endpoint with the IP address of the control plane message. When these two IP addresses are different, then the IPsec driver may determine that the active network adapter has changed at the TCP/IP stack. In another example, IPsec driver may keep a record of the IP address of the last control plane message and compare the IP address of the last control plane message with the IP address of the current control plane message. As in the previous scenario, when these two IP addresses are different, then the IPsec driver may determine that the active network adapter has changed at the TCP/IP stack.

At block 507, the IPsec driver may migrate the local endpoint of the IPsec tunnel to the currently active network interface without requesting re-establishment of the IPsec tunnel on the active network connection. For example, the IPsec driver may update the local endpoint of the tunnel stored by the IKE daemon and/or the IPsec driver with the IP address of the currently active network interface through corresponding system calls. This ability to seamlessly and dynamically migrate the local endpoint of the IPsec tunnel from one network interface of the client machine to another is referred to as a floating tunnel termination endpoint technique. Advantageously, by using the floating tunnel termination endpoint technique, the IPsec VPN client does not need to renegotiate with the VPN gateway when the active network connection has changed and the IPsec VPN client can retain its previously assigned IP address, thereby allowing the IPsec VPN client to maintain without interruption end-to-end application connections.

At block 508, the IPsec driver captures an IP packet from the TCP/IP stack.

At block 509, the IPsec driver retrieves the IPsec SA with the updated local endpoint of the IPsec tunnel from the IKE daemon or the IPsec driver and encapsulates the IP packet with the information regarding the updated local endpoint within the outer IP header to form an ESP data packet. Therefore, the ESP data packet with the updated local endpoint matches with the currently active network interface at the TCP/IP stack. The ESP data packet is sent back to the TCP/IP stack and is routed to the active network interface by the TCP/IP stack. In this manner, the local endpoint of the IPsec tunnel "floats" from one network interface to another depending upon the currently selected active network adapter and the ESP data packet can be sent to the VPN gateway from the active network adapter without re-establishing the IPsec tunnel with the VPN gateway on the active network connection when the active network connection is changed at the TCP/IP stack. As those skilled in the art will appreciate, embodiments of the present invention allow a local endpoint of an IPsec tunnel to migrate from an original network adapter to another network adapter while all the changes are transparent to the upper applications. Also, the IKE session can be maintained without re-authentication or rekey when such migration occurs.

Figure 6:
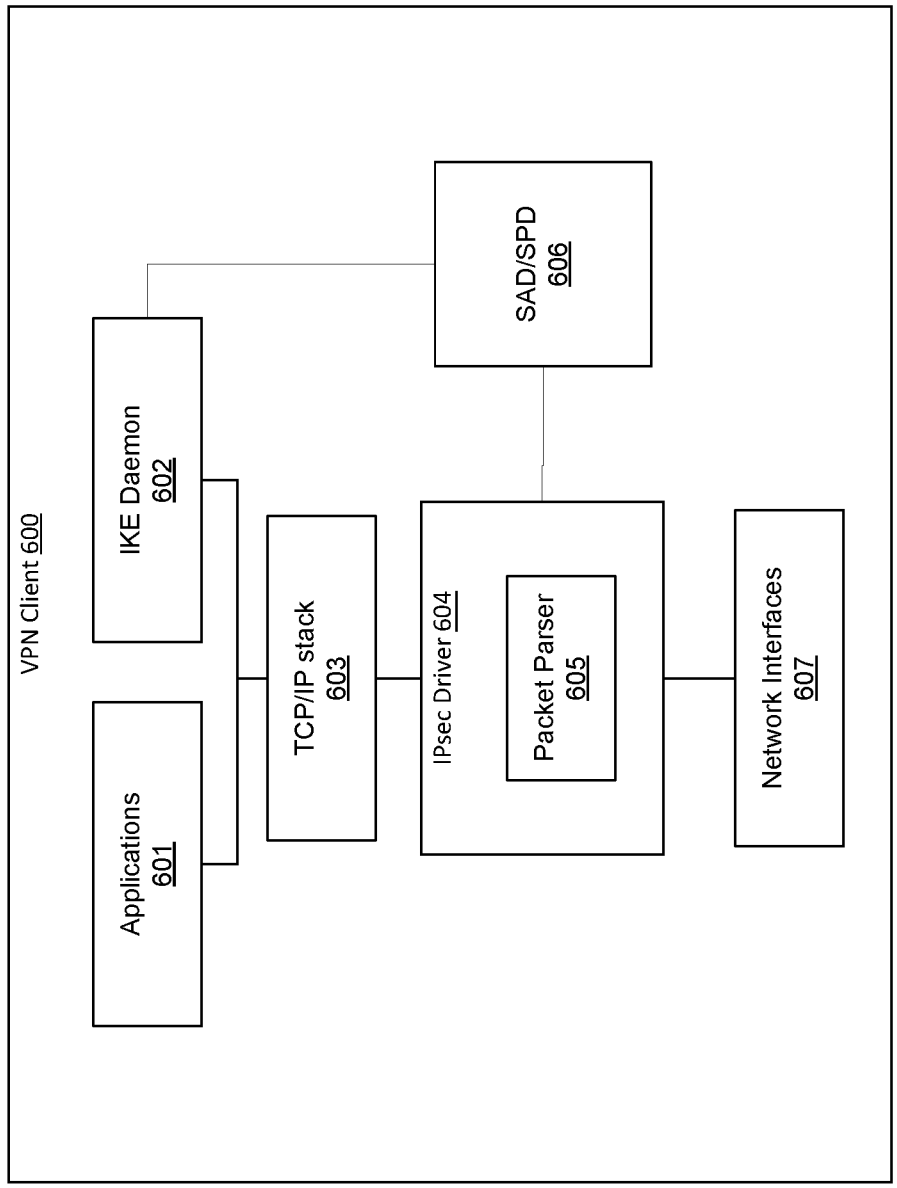
FIG. 6 is a block diagram illustrating functional units of an IPsec VPN client for seamlessly migrating an IPsec tunnel endpoint to a new network interface in accordance with externally provided customized configuration settings in accordance with an embodiment of the present invention.

FIG. 6 is a block diagram illustrating functional units of an IPsec VPN client 600 for seamlessly migrating a local IPsec tunnel endpoint to a new network interface in accordance with an embodiment of the present invention. In this example, VPN client 600 includes applications 601 and an IKE daemon 602 that run in user space of VPN client 600. VPN client 600 includes a TCP/IP stack 603 and an IPsec driver 604 that run in kernel space of VPN client 600. VPN client 600 also includes a security association database/security policy database (SAD/SPD) 606 stored in a memory of VPN client 600 and multiple physical network interfaces 607 that are used for data exchange with other network devices.

IKE daemon 602 is used for starting an IKE process and negotiating with a peer IKE of a VPN gateway (not shown) to establish an IPsec SA with the peer IKE. After an IPsec SA is established, an IP address of an active network interface among network interfaces 607 that was in use during the IKE negotiation is bound as the local endpoint of the IPsec tunnel. The IPsec SA parameters, including information regarding the endpoints (e.g., IP addresses and/or MAC addresses) of the IPsec tunnel, may be stored in the IKE daemon 602 and/or the IPsec driver 604.

TCP/IP stack 603 is used for, among other things, receiving outbound data sent from applications 601, constructing IP data packets from the outbound data, and routing the IP packets to an active network interface or the network interface with highest priority among active interfaces of network interfaces 607 for transmission. Before the IP packets are sent to a physical network interface for transmission, TCP/IP stack 603 sends IP packets to IPsec driver 604 for security processing.

IPsec driver 604 is bound to TCP/IP stack 603 to monitor and secure outbound and inbound IP traffic captured from TCP/IP stack 603. IPsec driver 604 determines if an IP packet should be secured based on a corresponding IPsec SA retrieved from IKE daemon 602 or IPsec driver 604. If the IPsec SA of the IP packet is an ESP tunnel SA, the entire IP packet is encapsulated with an ESP header and an outer IP header. The IP addresses of the outer IP header are set to the tunnel endpoints of the IPsec SA, wherein the source IP address of outer IP header is set to the IP address of the currently active network interface stored in the IPsec SA. IKE daemon 602 may also send a control plane message to the peer IKE of the VPN gateway. For example, an IKE dead peer detection (DPD) message may be sent to the peer IKE to detect the liveness of the peer IKE. Those skilled in the art will appreciate other kinds of control plane messages, including, but not limited to, keepalive messages, heartbeat messages or proprietary control plane messages may be exchanged between the peer IKEs on a periodic basis. The control plane message from IKE daemon 602 may be encapsulated with an IP header by TCP/IP stack 603 to construct an IP packet, wherein the source IP address of the IP header is set by TCP/IP stack 603 to the IP address of the currently active network adapter (which may be changed on the fly). The IP packet of the control plane message is captured by IPsec driver 604 and parsed by a packet parser 605 of IPsec driver 604. Packet parser 605 detects the control plane message based on the protocol used by the control plane. When the control plane message is detected by packet parser 605, the source IP address of the IP packet is extracted. IPsec driver 604 may determine whether the active network adapter being used by TCP/IP stack 603 has changed by comparing the IP address from the control plane message with (i) an IP address of a previous control plane message or (ii) the IP address of the current local endpoint of the IPsec tunnel. If these two IP addresses are different, then IPsec driver 604 may determine that the active network adapter has changed within TCP/IP stack 603. Then, IPsec driver 604 may migrate the local endpoint of the IPsec tunnel to the currently active network interface by updating the information regarding the local endpoint (e.g., the IP address and MAC address) of the IPsec SA stored within the IKE daemon 602 and/or the IPsec driver 604. Because the local IPSec tunnel endpoint is allowed to float from one network interface to another rather than being fixed, IPsec driver 604 does not need to request IKE daemon 602 to re-establish the IPsec tunnel on the currently active network connection. After the local IPSec tunnel endpoint has been migrated to the current active network connection, IP packets captured by IP stack 603 may be encapsulated with the updated local endpoint information that matches the currently active network connection to construct subsequent ESP data packets. The ESP data packets are sent by TCP/IP stack 603 to the active network connection for transmission to the VPN gateway. As the local IPsec tunnel endpoint is able to seamlessly float among various network interfaces of the client machine in accordance with embodiments of the present invention, the IPsec tunnel need not be reestablished, thereby avoiding VPN interruption and reducing the burden on the VPN gateway as well.

In other embodiments, one or more other entities of VPN client 600 may be tasked with various aspects associated with detecting the changing of active network connections and the associated migration from one network connection to another. For example, IKE daemon 602 may be the entity that detects the changing of active network connections and responsive thereto performing migration of the local IPsec tunnel endpoint from a previously active network interface to a currently active network interface. To detect the currently active network connection, IKE daemon 602 may check a TCP/IP routing table maintained by the operating system to determine the active network connection or the active network connection may be based on the network connection with the highest priority or a highest or lowest alternative metric or measurement. When IKE daemon 602 finds that the active network connection has changed in the TCP/IP routing table, the IPsec tunnel endpoints stored within the IKE daemon 602 and/or the IPsec driver 604 may be updated accordingly. Thereafter, when IPsec driver 604 encapsulates IP packets to construct ESP data packets, the endpoints of IPsec tunnel used for the encapsulation are those reflected by the updated information stored by IPsec driver 604 or IKE daemon 602. Therefore, ESP data packets with the updated active network connection as the source IP address of the outer IP header can be transmitted correctly to the VPN gateway.

Figure 7:
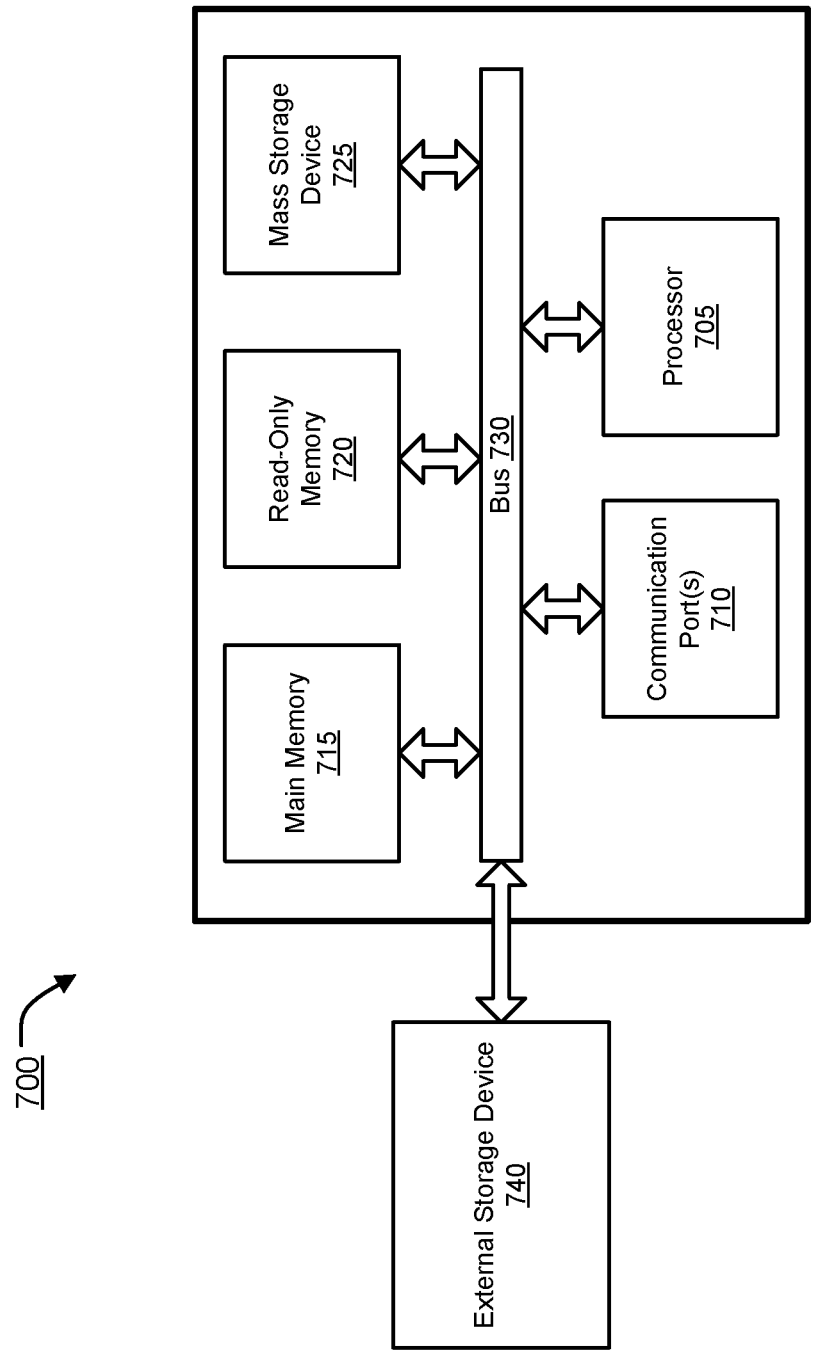
FIG. 7 is an exemplary computer system in which or with which embodiments of the present invention may be utilized.

FIG. 7 is an example of a computer system 700 with which embodiments of the present disclosure may be utilized. Computer system 700 may represent or form a part of a client workstation, a PC, a tablet computer, a laptop computer, a smartphone, a smart TV or other client machine upon which VPN client 110 is running. As shown, computer system 700 includes a bus 730, a processor 705, communication port 710, a main memory 715, a removable storage media 740, a read only memory 720 and a mass storage 725. Those skilled in the art will appreciate that computer system 700 may include more than one processor and communication ports.

Embodiments of the present disclosure include various steps, which have been described in detail above. A variety of these steps may be performed by hardware components or may be embodied on a non-transitory computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with embodiments of the present invention.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   establishing, by a client machine having a plurality of network interfaces, an Internet Protocol Security (IPsec) tunnel with a Virtual Private Network (VPN) gateway through a first network interface of the plurality of network interfaces, wherein the IPsec tunnel includes a local endpoint and a remote endpoint, wherein an IP address of the first network interface is initially bound as the local endpoint and wherein an IP address of the VPN gateway is bound as the remote endpoint;
   based on a control plane message originated by a user space daemon running on the client machine and directed to the VPN gateway, detecting, by the client machine, that a second network interface of the plurality of network interfaces has been selected to serve as the local endpoint for use in connection with exchanging communications between the client machine and the VPN gateway;
   responsive to said detecting, binding, by the client machine, an IP address of the second network interface as the local endpoint; and
   transmitting, by the client machine, an IP packet originated by an application running on the client machine to the VPN gateway by generating an encapsulating security payload (ESP) packet including an encrypted form of the IP packet and encapsulating the ESP packet with an outer IP header including the IP address of the second network interface.

2. The method of claim 1, wherein said detecting, by the client machine, that a second network interface of the plurality of network interfaces has been selected to serve as the local endpoint comprises:
   capturing, by an IPsec driver running within a kernel space of an operating system of the client machine, the control plane message;
   extracting, by the IPsec driver, a source IP address of the control plane message; and
   determining, by the IPsec driver, that the control plane message is to be transmitted through the second network interface based on the source IP address of the control plane message.

3. The method of claim 2, wherein said determining, by the IPsec driver, that the control plane message is to be transmitted through the second network interface comprises:
   comparing, by the IPsec driver, the source IP address of the control plane message with an IP address of the local endpoint; and
   when the source IP address of the control plane message is different than the IP address of the local endpoint, determining, by the IPsec driver, that the control plane message is to be transmitted through the second network interface.

4. The method of claim 2, wherein said determining, by the IPsec driver, that the control plane message is to be transmitted through the second network interface comprises:
storing, by the IPsec driver, a source IP address of a previous control plane message;
comparing, by the IPsec driver, the source IP address of the control plane message with the source IP address of the previous control plane message; and
when the source IP address of the control plane message is different than the source IP address of the previous control plane message, determining, by the IPsec driver, that the control plane message is to be transmitted through the second network interface.

5. The method of claim 2, wherein the control plane message comprises an Internet Key Exchange (IKE) dead peer detection (DPD) message.

6. The method of claim 2, wherein the control plane message comprises a keep-alive message, a heartbeat message or a control plane message of a proprietary protocol.

7. The method of claim 2, wherein the control plane message is transmitted periodically.

8. The method of claim 7, wherein the selected network interface comprises a network interface of the plurality of network interfaces through which connectivity to the VPN gateway is currently available.

9. The method of claim 7, wherein the selected network interface comprises a network interface of the plurality of network interfaces (i) through which connectivity to the VPN gateway is currently available, (ii) having a highest priority and (iii) selected by a Transmission Control Protocol (TCP)/Internet Protocol (IP) stack of the client machine.

10. The method of claim 2, wherein the control plane message is transmitted through a network interface of the plurality of network interfaces that has been selected by the operating system.

11. The method of claim 2, wherein said binding, by the client machine, an IP address of the second network interface as the local endpoint comprises:
storing, by an IPsec driver running within a kernel space of an operating system of the client machine, the IP address of the second network interface within a security association database (SAD); and
retrieving, by IPsec driver, the IP address of the second network interface from the SAD for use in connection with said encapsulating the ESP packet.

12. A non-transitory computer-readable storage medium embodying a set of instructions, which when executed by one or more processors of a client computer system having a plurality of network interfaces, causes the one or more processors to perform a method comprising:
establishing an Internet Protocol Security (IPsec) tunnel with a Virtual Private Network (VPN) gateway through a first network interface of the plurality of network interfaces, wherein the IPsec tunnel includes a local endpoint and a remote endpoint, wherein an IP address of the first network interface is initially bound as the local endpoint and wherein an IP address of the VPN gateway is bound as the remote endpoint;
based on a control plane message originated by a user space daemon running on the client computer system and directed to the VPN gateway, detecting that a second network interface of the plurality of network interfaces has been selected to serve as the local endpoint for use in connection with exchanging communications between the client computer system and the VPN gateway;
responsive to said detecting, binding an IP address of the second network interface as the local endpoint; and
transmitting an IP packet from the client computer system to the VPN gateway by generating an encapsulating security payload (ESP) packet including an encrypted form of the IP packet and encapsulating the ESP packet with an outer IP header including the IP address of the second network interface.

13. The non-transitory computer-readable storage medium of claim 12, wherein said detecting that a second network interface of the plurality of network interfaces has been selected to serve as the local endpoint comprises:
capturing, by an IPsec driver running within a kernel space of an operating system of the client computer system, the control plane message;
extracting, by the IPsec driver, a source IP address of the control plane message; and
determining, by the IPsec driver, that the control plane message is to be transmitted through the second network interface based on the source IP address of the control plane message.

14. The non-transitory computer-readable storage medium of claim 13, wherein said determining, by the IPsec driver, that the control plane message is to be transmitted through the second network interface comprises:
comparing the source IP address of the control plane message with an IP address of the local endpoint; and
when the source IP address of the control plane message is different than the IP address of the local endpoint, determining that the control plane message is to be transmitted through the second network interface.

15. The non-transitory computer-readable storage medium of claim 13, wherein said determining, by the IPsec driver, that the control plane message is to be transmitted through the second network interface comprises:
storing a source IP address of a previous control plane message;
comparing the source IP address of the control plane message with the source IP address of the previous control plane message; and
when the source IP address of the control plane message is different than the source IP address of the previous control plane message, determining that the control plane message is to be transmitted through the second network interface.

16. The non-transitory computer-readable storage medium of claim 13, wherein the control plane message comprises an Internet Key Exchange (IKE) dead peer detection (DPD) message.

17. The non-transitory computer-readable storage medium of claim 13, wherein the control plane message comprises a keep-alive message, a heartbeat message or a control plane message of a proprietary protocol.

18. The non-transitory computer-readable storage medium of claim 13, wherein the control plane message is transmitted through a network interface of the plurality of network interfaces that has been selected by the operating system.

19. The non-transitory computer-readable storage medium of claim 12, wherein the selected network interface comprises a network interface of the plurality of network interfaces through which connectivity to the VPN gateway is currently available.

20. The non-transitory computer-readable storage medium of claim 12, wherein the selected network interface comprises a network interface of the plurality of network interfaces (i) through which connectivity to the VPN gateway is currently available, (ii) having a highest priority and (iii) selected by a Transmission Control Protocol (TCP)/Internet Protocol (IP) stack of the client computer system.

* * * * *